(12) United States Patent
Gibbs et al.

(10) Patent No.: US 7,247,806 B2
(45) Date of Patent: Jul. 24, 2007

(54) COMPUTING DEVICE BEZEL AND FACIA BUTTON THEREFOR

(75) Inventors: Wayne David Gibbs, Houston, TX (US); Jeffrey A. Lambert, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 191 days.

(21) Appl. No.: 10/967,426

(22) Filed: Oct. 18, 2004

(65) Prior Publication Data

US 2006/0098000 A1    May 11, 2006

(51) Int. Cl.
*H01H 13/04* (2006.01)
*H01H 13/08* (2006.01)
(52) U.S. Cl. .............. 200/296; 200/293; 200/341
(58) Field of Classification Search ........ 200/341–345, 200/517, 556, 520, 293–296
See application file for complete search history.

(56) References Cited

U.S. PATENT DOCUMENTS

| | | | | |
|---|---|---|---|---|
| 5,552,956 | A * | 9/1996 | Pasquarette et al. | 361/680 |
| 6,051,799 | A * | 4/2000 | Fuhrmann | 200/331 |
| 6,054,662 | A * | 4/2000 | Hrehor et al. | 200/332 |
| 6,160,232 | A * | 12/2000 | Lin | 200/341 |
| 6,392,179 | B1 * | 5/2002 | Schwarzbich | 200/520 |
| 6,653,586 | B2 * | 11/2003 | Hsiung et al. | 200/517 |
| 6,914,206 | B2 * | 7/2005 | Mukougawa | 200/556 |

* cited by examiner

*Primary Examiner*—K. Lee (57) ABSTRACT

Disclosed are a computing device bezel and a facia button that is used with the bezel. In one embodiment, the facia button includes a base member, a finger interface that is supported by and that extends from the base member, an axis about which the facia button can pivot, and a spring member that is adapted to resist pivoting of the facia button, wherein the facia button is configured to contact and press an associated button of a device contained within the computing device.

27 Claims, 7 Drawing Sheets

COMPUTING DEVICE BEZEL AND FACIA BUTTON THEREFOR

BACKGROUND

Computing devices often comprise bezels that cover the front of the computing device and surround the various components that are accessible at the front of the computing device, such as media (e.g., floppy disk and optical disc) drives. Such bezels are typically designed so as to have a look and feel that is desired for the computing device, and often for an entire product line of computing and peripheral devices. That look and feel is normally referred to as the industrial design (ID) of the device or line.

Many devices that are accessed from the front of a computing device have buttons that actuate a mechanism of the device. For example, media drives have eject buttons that, when pressed, eject the storage media contained in the drive. Given that such devices are normally not manufactured by the manufacturer of the computing device, their designs often do not match the computing device ID. For instance, the size and configuration of the eject button may not fit the computing device ID. Moreover, the location of the eject button may not fit the ID.

In order to maintain the continuity of the computing device ID, computing device manufacturers sometimes provide facia buttons in the computing device bezel that, when pressed, contact and press an associated button of another device, such as an eject button of a media drive. Although use of facia buttons solves the continuity of design problem, that use can create other problems. For example, the desired position of the facia button according to the computing device ID may differ from the position of the associated device button, therefore complicating the task of obtaining full depression of the associated device button. Moreover, the position of the device button may vary between different makes and/or models of devices. Accordingly, the facia button must be designed so as to be able to contact and fully press the device button of each device that may be used in the computing device, or depression of the facia button may not yield the intended effect.

SUMMARY

Disclosed are a computing device bezel and a facia button that is used with the bezel. In one embodiment, the facia button includes a base member, a finger interface that is supported by and that extends from the base member, an axis about which the facia button can pivot, and a spring member that is adapted to resist pivoting of the facia button, wherein the facia button is configured to contact and press an associated button of a device contained within the computing device.

BRIEF DESCRIPTION OF THE DRAWINGS

The disclosed computing device bezel and facia button can be better understood with reference to the following drawings. The components in the drawings are not necessarily to scale.

DETAILED DESCRIPTION

Disclosed is a computing device bezel that incorporates a facia button that is configured to press an associated button of a device that is accessible from the computing device bezel. In some embodiments, the facia button comprises an eject facia button that, when pressed, presses an associated eject button of a media drive so as to actuate an eject mechanism of the media drive. As is described in the following, the position of a finger interface of the facia button within the bezel can be offset relative to the position of the associated device button. Due to the configuration of the facia button, however, full depression of the associated device button can be obtained through pressing of the facia button irrespective of the device make and model.

Figure 1:
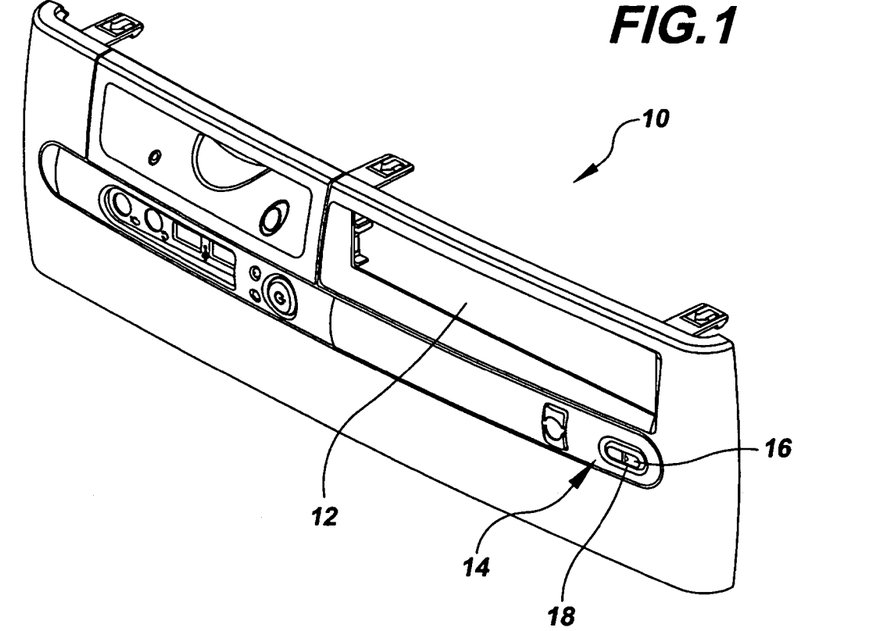
FIG. 1 is a front perspective view of an embodiment of a computing device bezel that incorporates a facia button.

Referring now in more detail to the drawings, in which like numerals indicate corresponding parts throughout the several views, FIG. 1 illustrates an example computing device bezel 10 that includes one or more facia buttons. The bezel 10 can be used in conjunction with a computing device, such as a personal computer (PC), Macintosh™ computer, notebook computer, handheld computer, or other computing device that comprises a processing device and memory that stores instructions that are executed by the processing device.

As is indicated in FIG. 1, the bezel 10 includes, among other things, an opening 12 that provides access to a device, such as a media device, and a facia button 14 that is configured to contact and press an associated button of the device that is accessed through the opening. By way of example, the device accessed through the opening 12 is an optical disc drive (not shown), and the associated button is a disc eject button (not shown). In such a case, the facia button 14 may be referred to as an eject facia button.

FIGS. 2–6 illustrate the facia button 14 in greater detail. As is described in the following, the facia button 14 comprises various different parts or portions. Typically, however, the facia button 14 is constructed as a single, unitary part formed of an appropriate material. By way of example, the facia button 14 is formed through an injection molding process using a suitable polymeric material, such as polycarbonate (PC), acrylonitrile-butadiene-styrene (ABS), or a combination of the two. Although specific materials have been identified, others could, of course, be used, including alternative polymeric materials and metal materials.

As is shown in FIGS. 2–3, and 5–6, the facia button 14 includes a finger interface 16 that, as is illustrated in FIG. 1, is configured to protrude through an opening 18 provided in the bezel 10. The finger interface 16 includes indicia 20 that identify the function of the button 14 (e.g., to eject media), and is configured to be directly pressed by a user, for instance using an index finger. In the embodiment illustrated in the figures, the finger interface 14 is elongated in a horizontal direction (see FIG. 1) and has rounded ends. As is illustrated best in FIG. 6, the finger interface 16 tapers so as to fit the tapered contour of the exterior of the bezel (see FIG. 1).

With further reference to FIGS. 2–3 and 5–6, the finger interface 16 is supported by and extends from a generally square base member 22 that includes a first or upper portion 24 and a second or lower portion 26. More particularly, the finger interface 16 is supported by a raised portion 28 that is formed on the upper and lower portions 24, 26. The raised portion 28 is received by a recess formed in the interior side of the bezel 10 and, therefore, has a size and shape that is configured to accommodate that recess. Generally speaking, however, the raised portion 28 is substantially rectangular and elongated along a horizontal direction like the finger interface 16. In the illustrated embodiment, the raised portion 28 extends beyond the periphery of the upper and lower portions 24 and 26, and terminates in a rounded end 30. As is shown in the figures, the finger interface 16 is supported by that portion of the raised portion 28 that extends beyond the periphery.

The upper portion 24 of the facia button 14 is substantially planar and rectangular so as to have a plate-like shape. As is discussed below, this "plate" contacts and presses the associated device button when the finger interface 16 is pressed by the user. In some embodiments, the upper edge of the upper portion 24 is responsible for activating the associated device button. Given that the position of the associated device button may vary depending upon the make and model of device that is used in the computing device, the upper portion 24 is large relative to the finger interface 16 to as to ensure positive contact between the facia button 14 and the associated device button.

Figure 2:
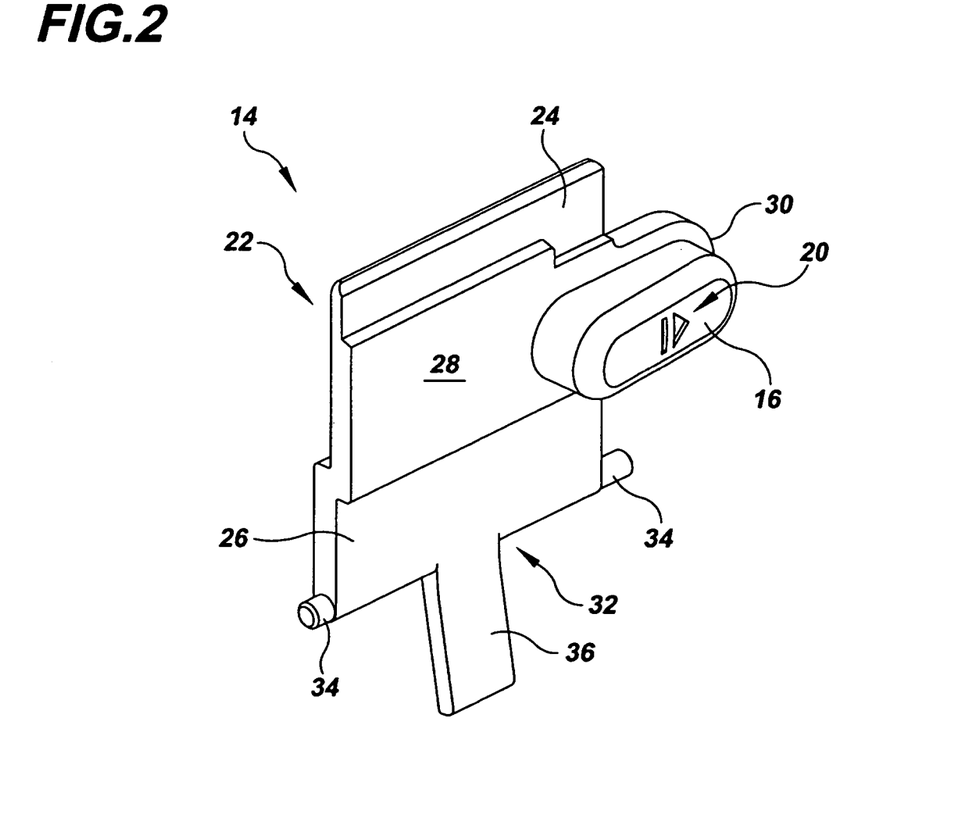
FIG. 2 is a front perspective view of an embodiment of facia button used with the bezel shown in FIG. 1.
Figure 3:
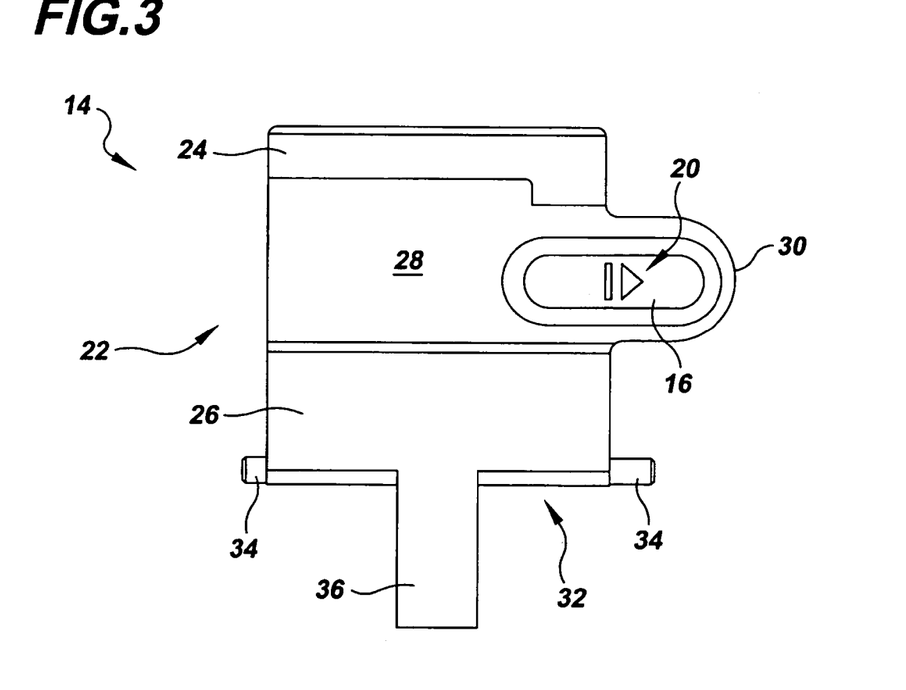
FIG. 3 is a front view of the facia button shown in FIG. 2.
Figure 4:
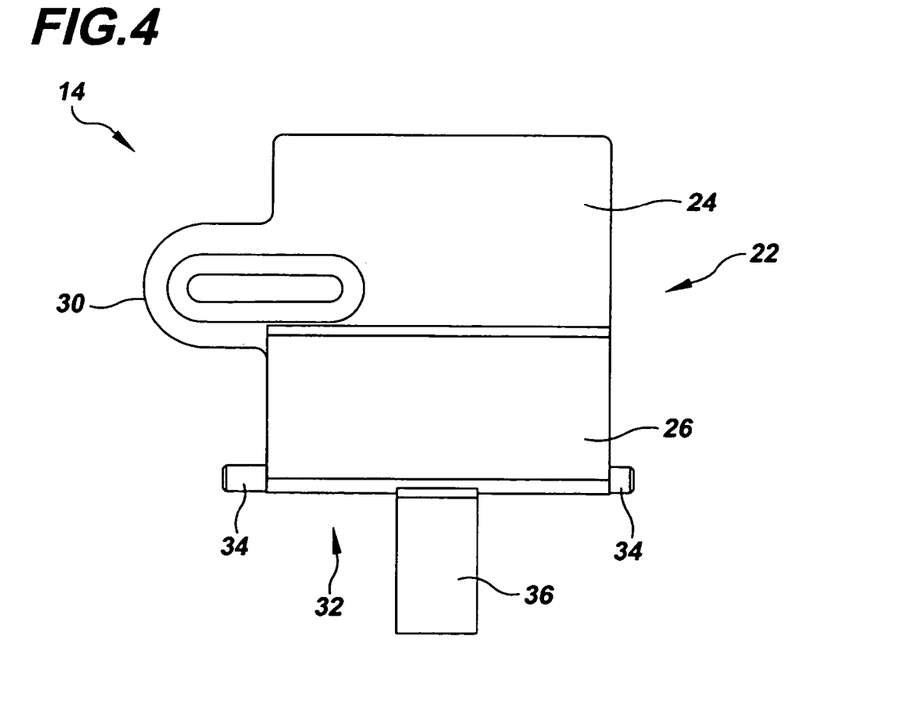
FIG. 4 is a rear view of the facia button shown in FIGS. 2 and 3.
Figure 5:
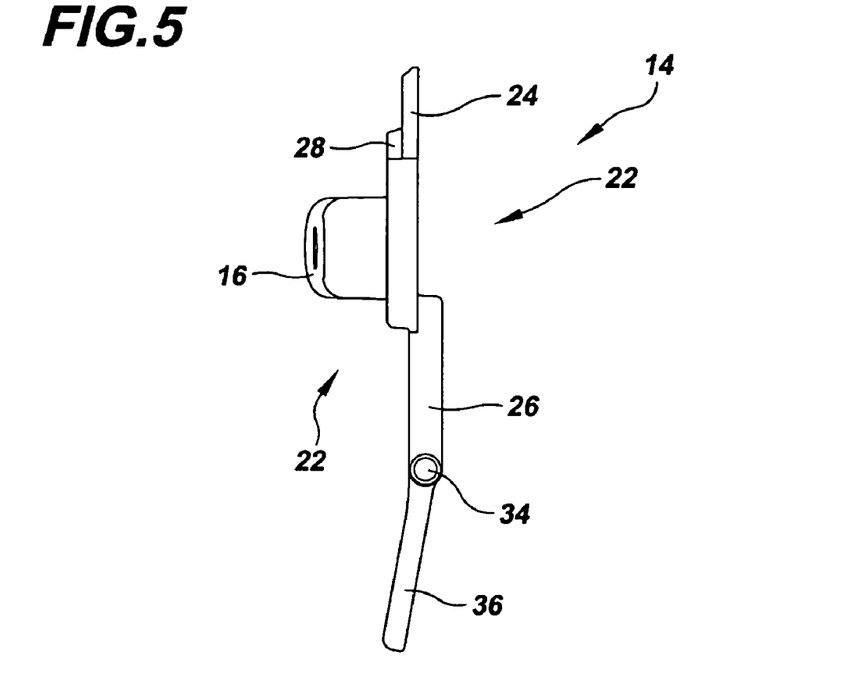
FIG. 5 is a side view of the facia button shown in FIGS. 2–4.
Figure 6:
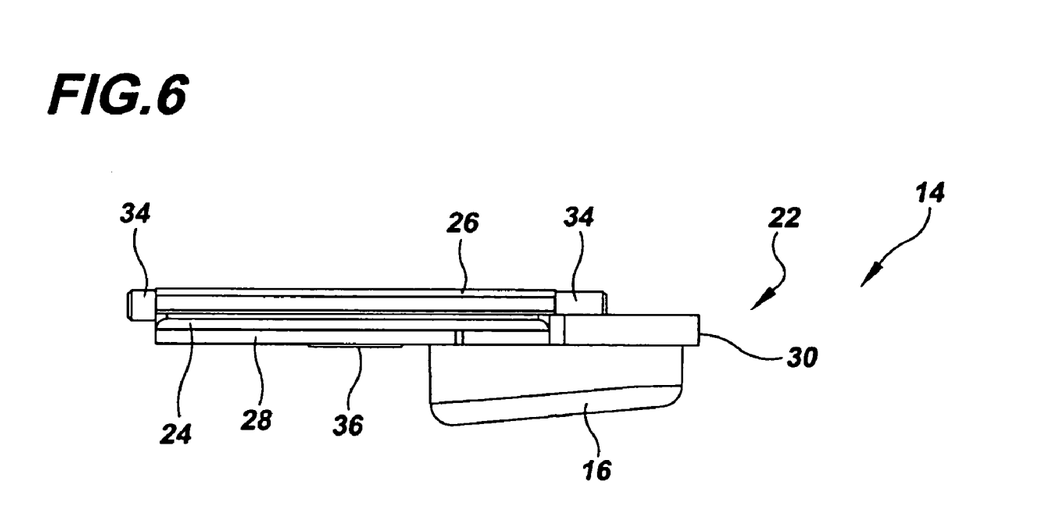
FIG. 6 is a top view of the facia button shown in FIGS. 2–5.
Figure 7:
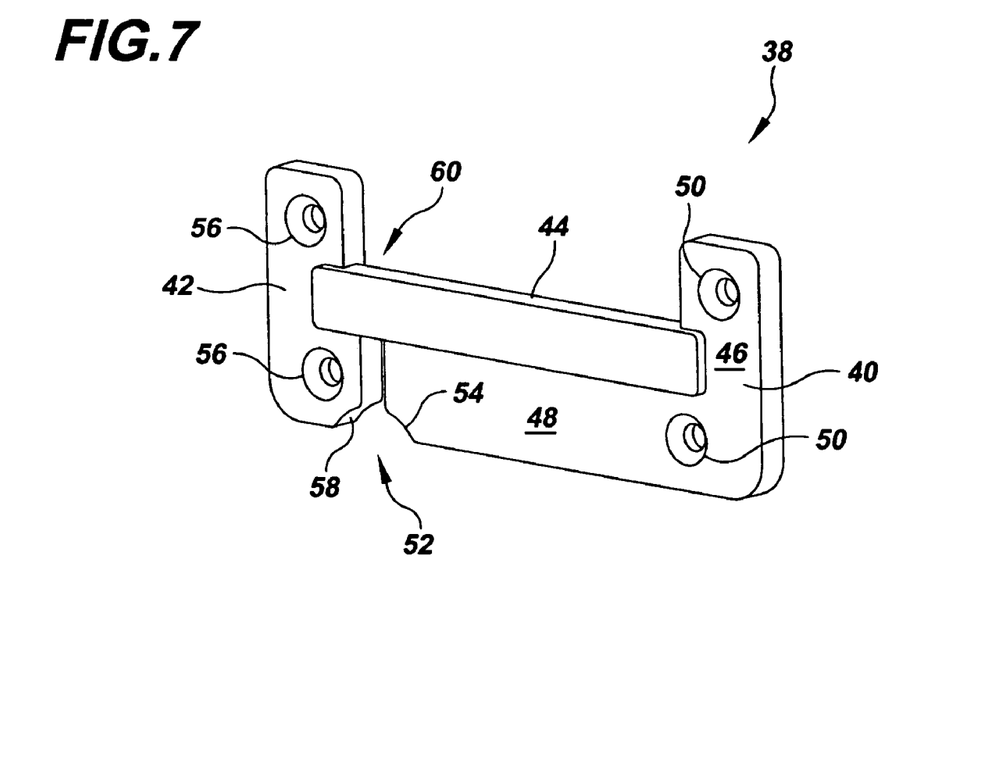
FIG. 7 is a rear perspective view of an embodiment of a button retainer that can be used in conjunction with the facia button shown in FIGS. 2–6.
Figure 8:
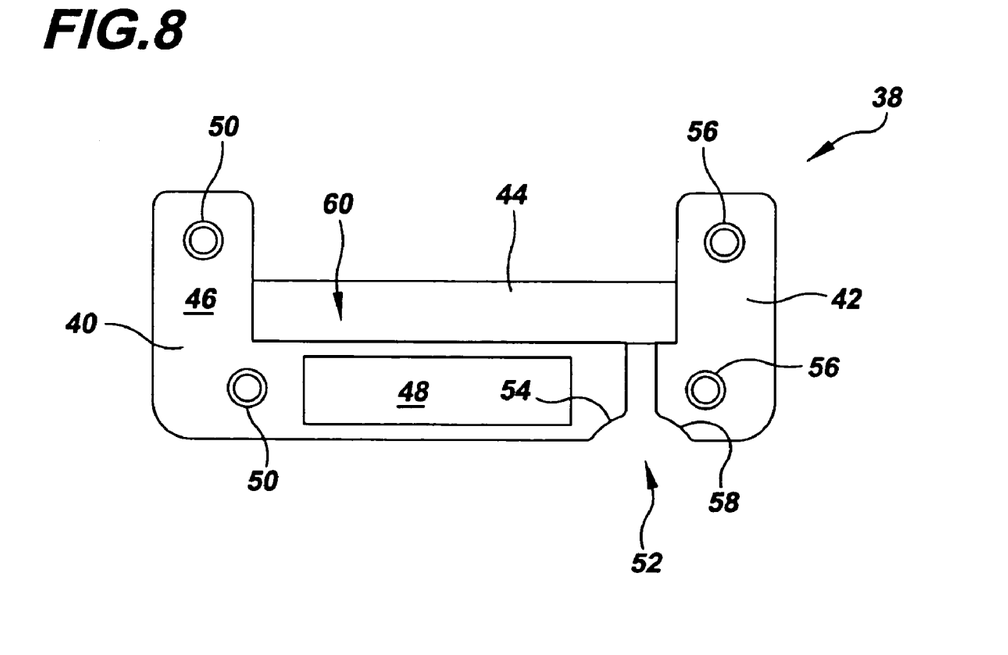
FIG. 8 is front view of the button retainer shown in FIG. 7.
Figure 9:
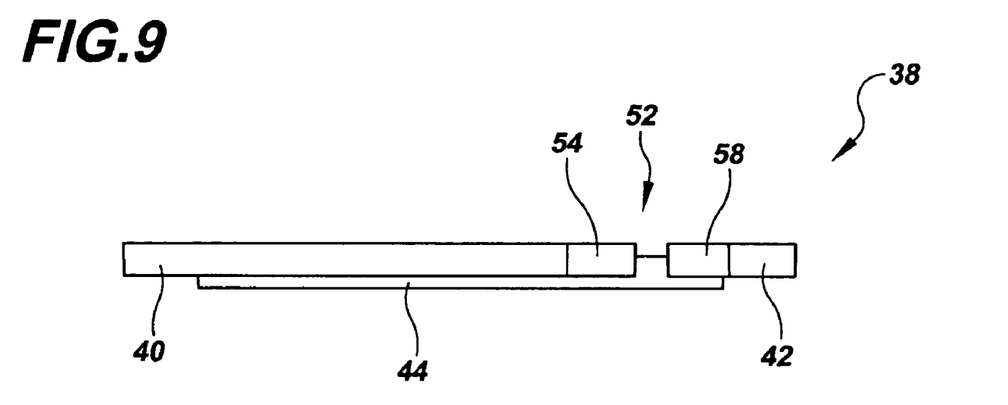
FIG. 9 is a bottom view of the button retainer shown in FIGS. 7 and 8.
Figure 10:
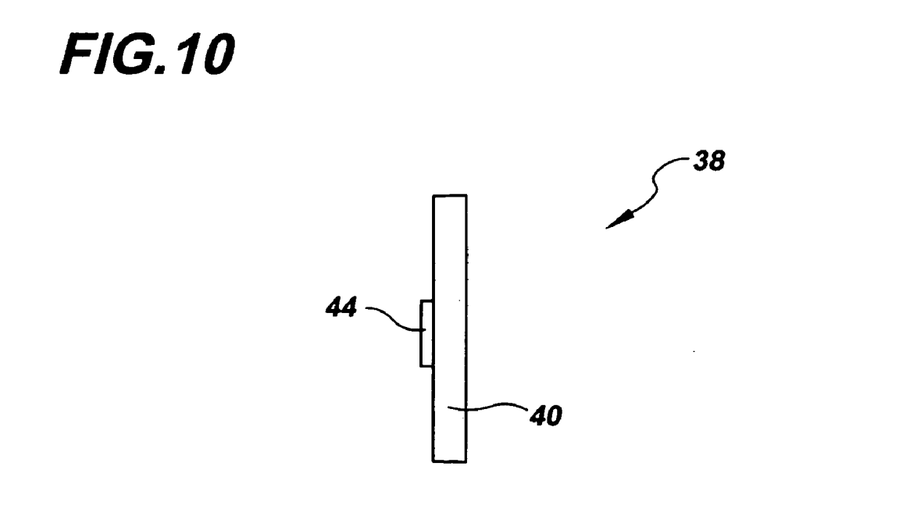
FIG. 10 is a side view of the button retainer shown in FIGS. 7–9.

As with the upper portion 24, the lower portion 26 is substantially planar and rectangular. The lower portion 26, however, is thicker than the upper portion 24. This thickness provides increased structural integrity to the facia button 14, which reduces flexing or twisting of the button that could potentially result in the associated device button not being fully depressed when the facia button is pressed by the user. As is best illustrated in FIGS. 2 and 5, the lower portion 26 is offset in a rearward direction relative to the upper portion 24. This offset accounts for the contours of the interior side of the bezel 10, and therefore ensures that the facia button 14 does not interfere with the bezel 10 when the button is installed and used.

Positioned at a bottom edge 32 of the lower portion 26 are pivot axles 34 that, as is described in greater detail below, enable the facia button 14 to pivot about a horizontal axis located adjacent the bottom edge of the lower portion. In the illustrated embodiment, the pivot axles 34 extend horizontally outward from the bottom edge 32 of the lower portion 26 so as to be positioned for receipt by notches formed on the interior side of the bezel 10 (see FIG. 11). By way of example, the pivot axles 34 are configured as short rods that extend outward from the base member 22. Notably, although two separate axles 34 have been described, a single, elongated axle that extends from one side of the base member 22 to the other could, alternatively, be used to achieve the same result.

Also extending from the bottom edge 32 of the lower portion 26 is a spring member 36. In the embodiment illustrated in the figures, the spring member 36 comprises an elongated leaf spring that extends downwardly from a generally central position along the length of the bottom edge 32. As is most apparent from FIG. 5, the spring member 36 also extends forwardly at an angle as it extends away from the base member 22. As is discussed below, this forward extension ensures positive contact between the spring member 36 and the interior side of the bezel 10 such that, when the finger interface 16 is pressed and the facia button 14 pivots about the axis defined by the axles 34, the spring member resists such pivoting to provide tactile feedback to the user and to cause the facia button to return to its initial position after the user's finger is removed. Normally, the spring member 36 contacts and is slightly deflected by the interior side of the bezel 10 when in the initial position such that the facia button 14 is preloaded by the spring member.

Referring next to FIGS. 7–10, illustrated is a button retainer 38 that is used to hold the facia button 14 in place on the bezel 10. The retainer 38, like the facia button 14, is typically constructed as a single, unitary part from an appropriate material. By way of example, the retainer 38 is formed through an injection molding process using a suitable polymeric material, such as PC, ABS, or a combination of the two. Although specific materials have been identified, others could, of course, be used, including alternative polymeric materials and metal materials.

The button retainer 38 generally comprises three main portions including a first lateral portion 40, a second lateral portion 42, and central portion 44. The first lateral portion 40 includes a vertical section 46 and a horizontal section 48 that extends laterally from the vertical section. Provided in the vertical section 46 of the first lateral portion 40 are mounting holes 50. As is described in greater detail below, the mounting holes 50 are provided so as to enable the button retainer 38 to be mounted to the interior side of the bezel 10 with the facia button 14 positioned between the retainer and the bezel. By way of example, the mounting holes 50 are configured to receive studs of the bezel 10 that are used to heat stake the retainer 38 in place. Positioned at an end 52 of the horizontal section 48 of the first lateral portion 40 is a semicircular notch 54 that, as is described below, provides room for a boss formed on the interior side of the bezel 10.

The second lateral portion 42 also comprises mounting holes 56 that, like the mounting holes 50, enable the button retainer 38 to be mounted to the interior side of the bezel 10. By way of example, the mounting holes 56 are configured to receive studs of the bezel 10 that are used to heat stake the retainer 38 in place. Also like the first lateral portion 40, the second lateral portion 42 includes a semicircular notch 58 that provides room for the aforementioned boss of the bezel 10.

The central portion 44 of the retainer 38 is elongated and generally rectangular. The central portion 44 links the first and second lateral portions 40, 42 together. However, as is indicated most clearly in FIGS. 7, 9, and 10, the central portion 44 is offset relative to the first and second lateral portions 40, 42. Specifically, the central portion 44 is offset in a rearward direction relative to the first and second lateral portions 40, 42. This offset forms a space 60, which provides room for the facia button 14 to pivot when pressed by a user.

Figure 11:
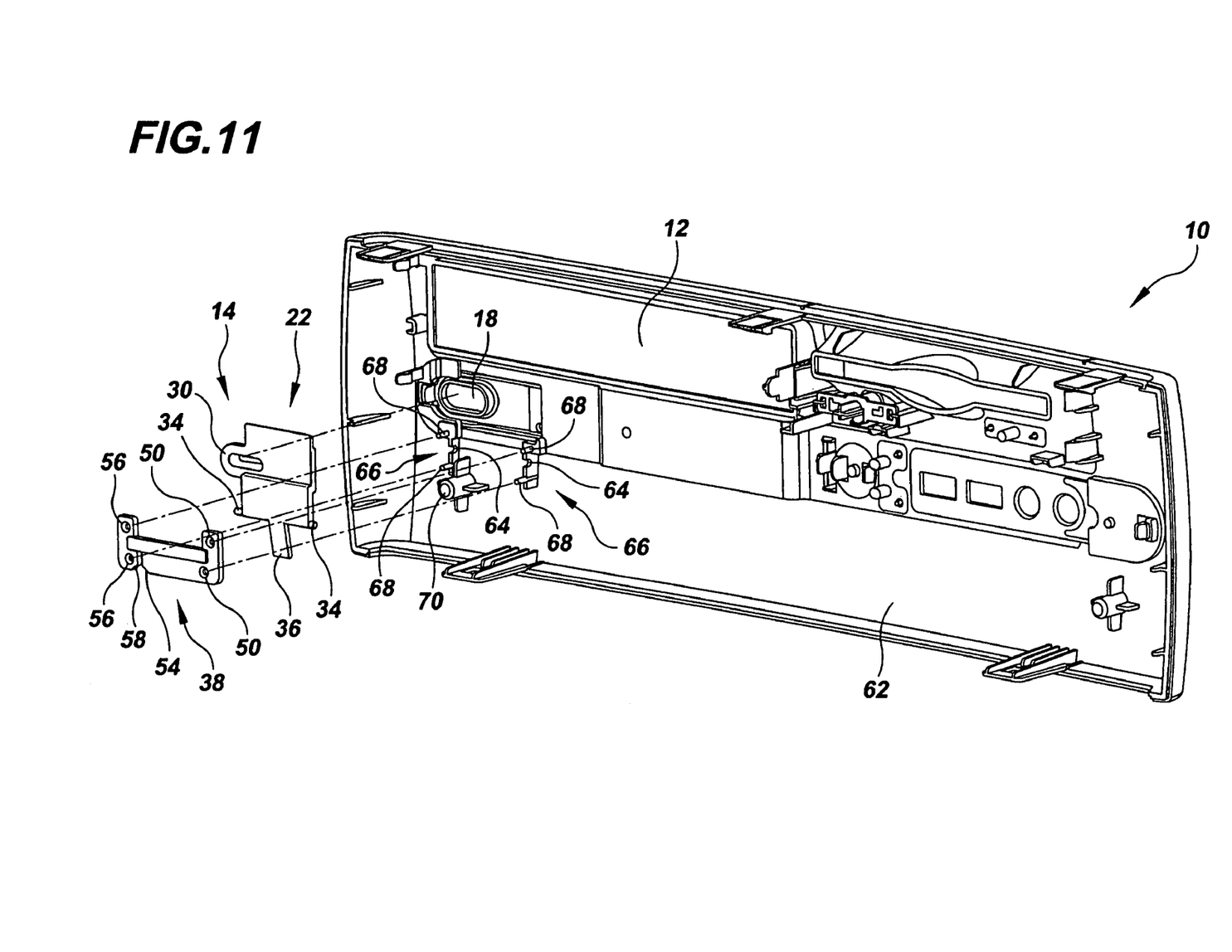
FIG. 11 is an exploded rear perspective view of the bezel of FIG. 1, illustrating installation of the facia button of FIGS. 2–6.

FIG. 11 demonstrates the manner in which the facia button 14 can be installed on the bezel 10 using the button retainer 38. Specifically, illustrated is a method for mounting the facia button 14 to the interior side 62 of the bezel using the retainer 38.

In the example mounting process, the facia button. 14 is configured so that its front side faces the interior side 62 of the bezel as indicated in FIG. 11. The facia button 14 is then placed in contact with the bezel 10. In particular, the facia button 14 is positioned so that its pivot axles 34 are received by pivot notches 64 that are formed in ribs 66 of the interior side 62 of the bezel 10. When the facia button 14 is positioned in this manner, the finger interface 16 is aligned with and extends through the opening 18 formed in the bezel 10. In addition, the spring member 36 is urged against the interior surface of the interior side 62 so as to provide the preloading described in the foregoing.

Figure 12:
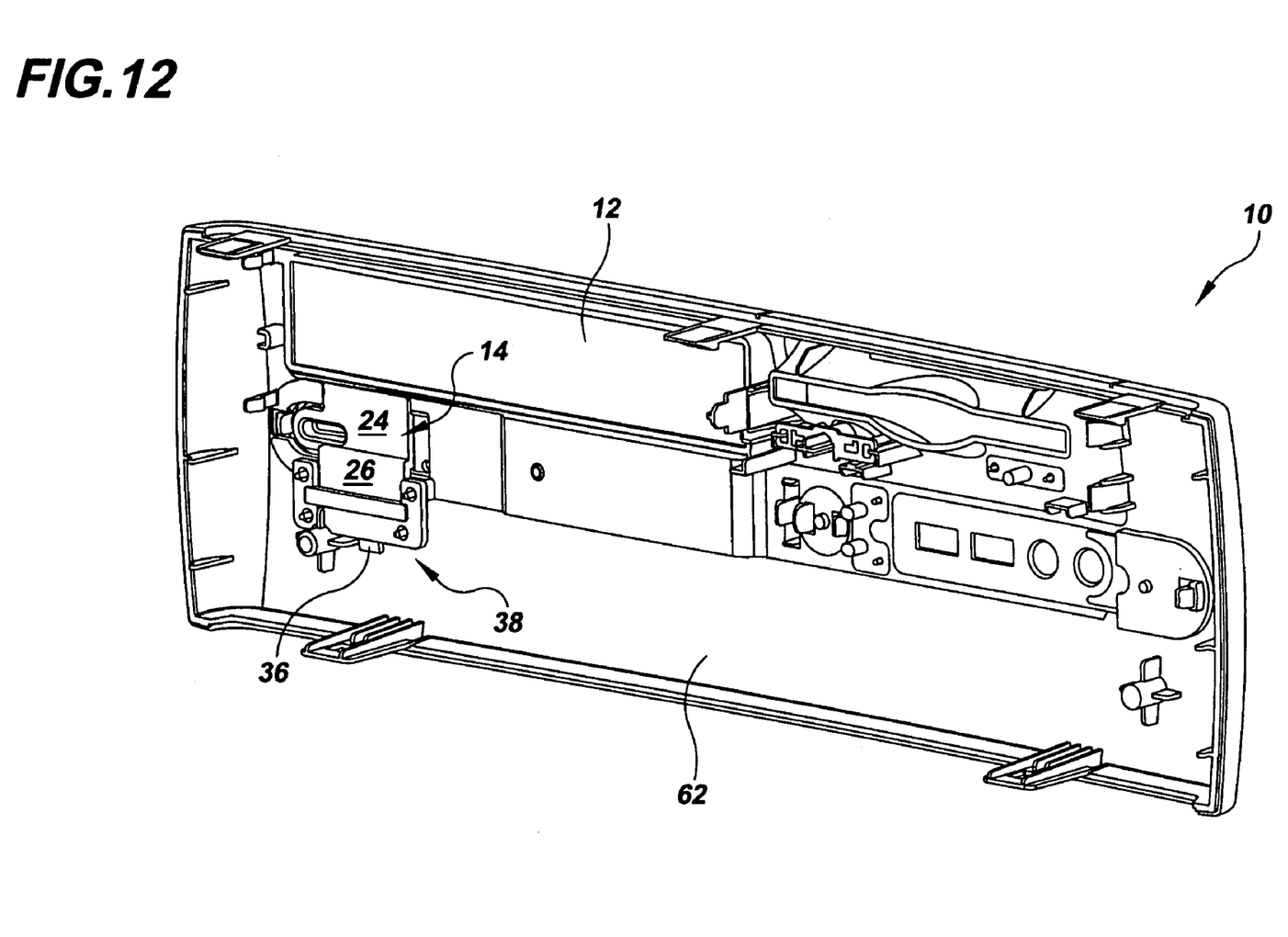
FIG. 12 is a rear perspective view of the bezel of FIG. 1 with the facia button of FIGS. 2–6 installed thereon.

Given that the axles 34 do not snap-lock into the notches 64, and given that the spring member 36 applies significant resistance as the facia button 14 is pivoted (i.e., when the user presses the facia button), the facia button 14 is secured in position with the button retainer 38. The retainer 38 is positioned behind the facia button 14 when the facia button is received by the pivot notches 64 in the manner described above. Specifically, the retainer 38 is placed over the facia button 14 so that the facia button is positioned between the retainer and the bezel 10 and studs 68 are passed through the mounting holes 50, 56 of the retainer. Once the retainer 38 is so positioned, the studs 68 are used to heat stake the retainer 38 in place over the facia button 14, resulting in the arrangement shown in FIG. 12. As is indicated in FIG. 12, the retainer 38 attaches to the bezel 10 such that a boss 70 of the bezel is positioned between the semicircular notches 54, 58 of the retainer.

With the above-described assembly process, the facia button 14 is securely held between the retainer 38 and the bezel 10. In such a configuration, the facia button 14 can be pressed by the user (i.e., the finger interface 16 may be pressed, FIG. 1) to effect depression of an associated button of a device used in the computing device, such as an optical disc drive. Given that the upper portion 24 is relatively large, the facia button 14 can be effectively used on various makes and models of devices that may have buttons (e.g., eject buttons) that are located in various different positions each off-center from the finger interface 16. Although the location of the associated button to be pressed does not coincide with the location of the finger interface 16, full depression of the associated button is achievable due to the rigidity provided by the lower portion 26 of the facia button 14. In particular, because the base member 22, and the lower portion 26 in particular, is relatively wide and thick, flexing and twisting of the facia button 14 in the horizontal and vertical directions are reduced, thereby ensuring full depression of the associated device button.

What is claimed is:

1. A facia button for a computing device bezel, the facia button comprising:
    a base member;
    a finger interface that is supported by and that extends from the base member;
    an axis about which the facia button can pivot; and
    a spring member that extends forward from the base member so as to be adapted to press against an interior surface of the computing device bezel to resist pivoting of the facia button;
    wherein the facia button is configured to contact and press an associated button of a device contained within the computing device.

2. The facia button of claim 1, wherein the base member is generally square.

3. The facia button of claim 1, wherein the base member includes an upper portion that is configured to contact and press the associated device button.

4. The facia button of claim 3, wherein the base member further includes a lower portion that is adjacent the axis.

5. The facia button of claim 4, wherein the lower portion is offset in a rearward direction relative to the upper portion.

6. The facia button of claim 1, wherein the finger interface is elongated along a horizontal direction.

7. The facia button of claim 1, wherein the finger interface tapers to fit a contour of the computing device bezel.

8. The facia button of claim 1, wherein the spring member is an elongated leaf spring.

9. The facia button of claim 8, wherein the leaf spring extends downward from a bottom edge of the base member.

10. The facia button of claim 8, wherein the leaf spring extends forward from a bottom edge of the base member.

11. The facia button of claim 1, wherein the base member comprises a raised portion that supports the finger interface.

12. The facia button of claim 11, wherein the raised portion and the finger interface extend beyond a periphery of the base member such that the finger interface is offset relative to a portion of the base member that contacts and presses the associated device button.

13. The facia button of claim 1, wherein the pivot axis is defined by at least one pivot axle about which the facia button can pivot.

14. The facia button of claim 13, wherein the at least one pivot axle is positioned adjacent a bottom edge of the base member.

15. A facia button for a computing device bezel, the facia button comprising:
    a generally square base member including an upper member that is configured to contact and press an associated button of a device of the computing device and a lower member that provides structural integrity to the facia button;
    a finger interface that is supported by and that extends forward from the base member;
    a pivot axle about which the facia button can pivot, the pivot axle being positioned adjacent a bottom edge of the lower member; and
    an elongated leaf spring that is adapted to resist pivoting of the facia button, the leaf spring extending downward and forward from the bottom edge of the lower portion;
    wherein the finger interface is offset from the position of the associated device button when the facia button is installed on the computing device bezel.

16. The facia button of claim 15, wherein the lower member is offset in a rearward direction relative to the upper member.

17. The facia button of claim 15, wherein the lower member is thicker than the upper member.

18. The facia button of claim 15, wherein the base member comprises a raised portion that supports the finger interface.

19. The facia button of claim 18, wherein the raised portion and the finger interface extend beyond a periphery of the base member.

20. A facia button for a bezel of a computing device, the facia button comprising:
- a base member having a portion adapted to contact and press a button of a device mounted within the computing device adjacent the bezel;
- a finger interface that is supported by and that extends from the base member, the finger interface being laterally offset from the base member portion adapted to contact and press the device button;
- an axis about which the facia button can pivot; and
- a spring member that is adapted to be urged against an interior surface of the bezel when the finger interface is pressed so as to resist pivoting of the facia button.

21. The facia button of claim 20, wherein the base member is larger than the finger interface.

22. The facia button of claim 20, wherein the portion adapted to contact and press the device button comprises an upper portion of the base member.

23. The facia button of claim 22, wherein the base member further includes a lower portion that is adjacent the axis.

24. The facia button of claim 20, wherein the spring member is an elongated leaf spring.

25. The facia button of claim 24, wherein the leaf spring extends downward from the base member.

26. The facia button of claim 24, wherein the leaf spring extends forward from the base member.

27. The facia button of claim 20, wherein the finger interface extends beyond a periphery of the base member.

* * * * *